United States Patent
Atoun et al.

(10) Patent No.: US 11,373,001 B2
(45) Date of Patent: Jun. 28, 2022

(54) SCREEN CAPTURING AND MASKING SYSTEM AND METHOD

(71) Applicant: Glassbox Ltd., Petah Tikva (IL)

(72) Inventors: Eliav Atoun, Tel Mond (IL); Oleg Bezrudny, Netanya (IL)

(73) Assignee: Glassbox Ltd., Petah Tikva (IL)

( * ) Notice: Subject to any disclaimer, the term of this patent is extended or adjusted under 35 U.S.C. 154(b) by 117 days.

(21) Appl. No.: 16/566,925

(22) Filed: Sep. 11, 2019

(65) Prior Publication Data

US 2020/0110899 A1 Apr. 9, 2020

Related U.S. Application Data

(60) Provisional application No. 62/742,957, filed on Oct. 9, 2018.

(51) Int. Cl.
| | |
|---|---|
| *G06F 21/62* | (2013.01) |
| *G06F 3/04812* | (2022.01) |
| *G06F 21/84* | (2013.01) |
| *G06F 3/04845* | (2022.01) |

(52) U.S. Cl.
CPC ...... *G06F 21/6245* (2013.01); *G06F 3/04812* (2013.01); *G06F 3/04845* (2013.01); *G06F 21/84* (2013.01)

(58) Field of Classification Search
None
See application file for complete search history.

(56) References Cited

U.S. PATENT DOCUMENTS

| | | | |
|---|---|---|---|
| 7,940,929 B1* | 5/2011 | Sengupta | G06F 21/6272 380/51 |
| 8,001,489 B2* | 8/2011 | McKeon | G06F 9/451 715/854 |
| 9,582,482 B1 | 2/2017 | Sharifi et al. | |
| 2006/0190489 A1* | 8/2006 | Vohariwatt | G06Q 10/00 |
| 2008/0046843 A1* | 2/2008 | McKeon | G06F 9/451 715/853 |
| 2008/0239365 A1* | 10/2008 | Salgado | G06F 3/1284 358/1.15 |
| 2010/0043017 A1* | 2/2010 | Paul | G06F 8/64 719/328 |
| 2012/0036452 A1* | 2/2012 | Coleman | G06F 21/55 715/751 |

(Continued)

FOREIGN PATENT DOCUMENTS

EP 3319353 A2 * 5/2018 ........... G06Q 30/016

*Primary Examiner* — Mandrita Brahmachari

(57) ABSTRACT

A screen capturing method comprising: providing an application configured to display an application screen comprising a plurality of display objects to a user of a user device, wherein a subset of the display objects is associated with information to be masked, and wherein at least one of the display objects of the subset is located at different locations in at least two different layouts of the application screen; receiving a request to obtain a centralized managed list comprising one or more records including information characterizing the subset; and sending the centralized managed list to the user device, thereby enabling the user device to determine a location of the subset and to generate at least one screen capture of the application screen in which the subset of the display objects associated with the information to be masked is masked.

20 Claims, 4 Drawing Sheets

(56) References Cited

U.S. PATENT DOCUMENTS

| | | |
|---|---|---|
| 2013/0132833 A1 | 5/2013 | White et al. |
| 2014/0280517 A1 | 9/2014 | White et al. |
| 2017/0186127 A1 | 6/2017 | Yu et al. |
| 2018/0049023 A1 | 2/2018 | Stuber et al. |
| 2018/0089459 A1* | 3/2018 | Eisen .................. H04N 1/4486 |

* cited by examiner

SCREEN CAPTURING AND MASKING SYSTEM AND METHOD

TECHNICAL FIELD

The invention relates to a screen capturing and masking system and method.

BACKGROUND

In recent years, more and more services are provided on-line, over the Internet. This trend simplifies access to the services on the one hand, but on the other hand, it creates new challenges. One of the major challenges in the on-line services field is maintaining the privacy of users that consume the on-line services. In light of the understanding of the real and meaningful need in keeping the privacy of on-line services users, many governments worldwide have made legislative efforts aimed at preventing leakage of personal and/or confidential information into the hands of third parties that are not entitled to view such information.

Many on-line service providers have a need in recording on-line sessions made by users that use their services, for example for dispute resolution, or problem solution. However, due to regulative restrictions, there is a need to mask certain parts of the recordings that comprise personal information or any other type of information that is somehow marked for masking. For example, some fields that are shown on a given application screen, of an application through which an on-line service is provided, may include personal information that needs to be masked (e.g. a credit card number, a social security number, or any other personal information).

Such selective masking is a real challenge in the mobile applications field, in which the layouts of a given mobile application changes based on various parameters, such as a type of mobile device, an operating system or a version thereof, a display type (portrait/landscape), and other parameters. In addition, mobile applications do not necessarily enable unique identification of each field shown in each layout. Even if the definitions of the fields do enable unique identification thereof, any change in the selection of fields to be masked will require distribution of a new version of the mobile application, which will include the new settings of which fields are required to be masked.

There is thus a need in the art for a new screen capturing and masking system and method.

References considered to be relevant as background to the presently disclosed subject matter are listed below. Acknowledgement of the references herein is not to be inferred as meaning that these are in any way relevant to the patentability of the presently disclosed subject matter.

US Patent application No. 2014/0280517 (White et al.) published on Sep. 18, 2014, discloses systems and methods for capturing interaction data relating to a host application (app) implemented on a mobile device are disclosed. A tracking module is to embedded in the host application. Interaction data relating to the host application is captured on the mobile device with the tracking module. The captured interaction data is transmitted from the mobile device.

US Patent application No. 2017/0186127 (Yu) published on Jun. 29, 2017, discloses a method and an apparatus for capturing a screen on a mobile device, the method including: receiving, at the mobile device, a screen-capturing request for a current interface, where the current interface includes first data, and the first data includes personal information; and generating, according to screen-capturing request, a screen capture image for the current interface, where the first data in the current interface is replaced in the screen capture image with second data which is predefined. These embodiments avoid the need to manually mask an image by starting a dedicated image editing tool to anonymize a screen capture image, thereby significantly lowering the relatively high technical threshold of anonymization processing, reducing the error rate, and improving the modification quality of anonymization. Moreover, the replacement is directly made to the image while the screen is captured without interfering with normal use of reading.

U.S. Pat. No. 9,582,482 (Sharifi et al.) published on Feb. 28, 2017, discloses systems and methods for providing insight for entities in mobile onscreen content. For example, a method includes receiving, from a mobile device, an indication of selection of a first entity represented by a visual cue in first annotation data for a screen capture image of a screen of the mobile device and determining entities related to the first entity in a graph-based data store. The method may also include identifying a second entity in the screen capture image that is one of the entities related to the first entity, generating second annotation data, the second annotation data including a visual element linking the first entity and the second entity, and providing the second annotation data for display with the screen on the mobile device.

US Patent application No. 2018/0049023 (Stuber et al.) published on Feb. 15, 2018, discloses systems and methods for real-time, remote-control of mobile applications are provided. A communication session between a network device and a terminal device can be established. The network device can be configured to execute a mobile application. For example, the mobile application can include an input element at an initial state. The mobile application can be remotely controlled by the terminal device. Further, a data stream including content data can be received and transmitted during the communication session. For example, the content data can include an object presented by the mobile application. The content data can be displayed on the terminal device. An input event associated with the content data can be detected. Control data can be generated based on the detected input event. The control data can be received at the network device and the initial state of the input element can be modified.

US Patent application No. 2013/0132833 (White et al.) published on May 23, 2013, discloses systems and methods for monitoring user interaction with a remote computer. More specifically, the systems and methods of the present invention allow for the remote tracking and replay of user interaction with a remote computer or webpage. One aspect of the invention allows user interaction data to be replayed on an embedded browser on a replay server. The replayed user interaction data may be converted to a video file to facilitate playback of the interaction data substantially independent of the replay server.

General Description

In accordance with a first aspect of the presently disclosed subject matter, there is provided a screen capturing method, the method comprising: providing an application configured to display an application screen comprising a plurality of display objects to a user of a user device, wherein a subset of the display objects is associated with information to be masked, and wherein at least one of the display objects of the subset is located at different non-uniquely identifiable locations in at least two different layouts of the application screen; receiving, from the user device, upon execution of the application, a request to obtain a centralized managed list comprising one or more records including information characterizing the subset of the display objects associated with the information to be masked; and sending the centralized managed list to the user device, thereby enabling the user device to determine a location, within the application screen displayed in a given layout of the at least two different layouts, of the subset of the display objects associated with the information to be masked and to generate at least one screen capture of the application screen in which the subset of the display objects associated with the information to be masked is masked.

In some cases, the method further comprises receiving the at least one screen capture of the application screen and storing the at least one screen capture of the application screen in a data repository.

In some cases, the information characterizing the subset of the display objects associated with the information to be masked in each of the records includes non-heuristic identifiers.

In some cases, the non-heuristic identifiers include one or more of: a non-unique object id, an object place holder text, an object key.

In some cases, the information characterizing the subset of the display objects associated with the information to be masked in each of the records includes heuristic identifiers, each identifying a corresponding display object of the subset of the display objects associated with the information to be masked.

In some cases, each of the heuristic identifiers is a selector, being a path of objects expected to nest, in a corresponding layout of the at least two different layouts, a corresponding display object of the subset of the display objects associated with the information to be masked.

In some cases, the location of the subset of the display objects associated with the information to be masked is determined by finding an exact match between the path and an existing path within a data structure defining the application screen displayed in the given layout.

In some cases, upon no exact match being found, the location of the subset of the display objects associated with the information to be masked is determined by: (a) identifying a first group of one or more first anchors within the selector; (b) matching a maximal number of the first anchors within the first group with respective objects within one or more paths within the data structure, according to an order of the first anchors within the selector, giving rise to matching paths; (c) upon matching all of the first anchors within the first group with respective objects within one or more paths within the data structure, matching at least one object to be masked nested within the first anchors within any of the one or more paths within the data structure with a last object within the selector, assumed to be the corresponding display object of the subset of the display objects associated with the information to be masked; (d) upon not matching all of the first anchors within the first group with respective objects within one or more paths within the data structure, identifying a second group of one or more second anchors, other than the first anchors, within the selector, wherein the second anchors are subsequent to any previously matched first anchor; and (e) repeating (b)-(d) with the second group being the first group, the second anchors being the first anchors, wherein the matching being performed by comparing sub-paths starting from a last matched first anchor of the first anchors, the last matched first anchor being the furthest in the selector, and wherein the repeating is performed until no unused anchors exist within the selector.

In some cases, the second anchors within the second group is statistically more frequently found in the layouts of the application screen than the first anchors within the first group.

In some cases, upon the repeating being performed until no unused anchors exist within the selector, the method further comprises repeating (a)-(e) with a subsequent record of the records.

In accordance with a second aspect of the presently disclosed subject matter, there is provided a screen capturing method, the method comprising: providing an application configured to display an application screen comprising a plurality of display objects to a user of a user device, wherein a subset of the display objects is associated with information to be masked, and wherein at least one of the display objects of the subset is located at different non-uniquely identifiable locations in at least two different layouts of the application screen; requesting, from a server, upon execution of the application, to receive a centralized managed list comprising one or more records including information characterizing the subset of the display objects associated with the information to be masked; receiving the centralized managed list from the server; determining a location, within the application screen displayed in a given layout of the at least two different layouts, of the subset of the display objects associated with the information to be masked; and generating at least one screen capture of the application screen in which the subset of the display objects associated with the information to be masked is masked.

In some cases, the method further comprises sending the at least one screen capture of the application screen to the server for storage in a data repository.

In some cases, the information characterizing the subset of the display objects associated with the information to be masked in each of the records includes non-heuristic identifiers.

In some cases, the non-heuristic identifiers include one or more of: a non-unique object id, an object place holder text, an object key.

In some cases, the information characterizing the subset of the display objects associated with the information to be masked in each of the records includes heuristic identifiers, each identifying a corresponding display object of the subset of the display objects associated with the information to be masked.

In some cases, each of the heuristic identifiers is a selector, being a path of objects expected to nest, in a corresponding layout of the at least two different layouts, a corresponding display object of the subset of the display objects associated with the information to be masked.

In some cases, the location of the subset of the display objects associated with the information to be masked is determined by finding an exact match between the path and an existing path within a data structure defining the application screen displayed in the given layout.

In some cases, upon no exact match being found, the location of the subset of the display objects associated with the information to be masked is determined by: (a) identifying a first group of one or more first anchors within the selector; (b) matching a maximal number of the first anchors within the first group with respective objects within one or more paths within the data structure, according to an order of the first anchors within the selector, giving rise to matching paths; (c) upon matching all of the first anchors within the first group with respective objects within one or more paths within the data structure, matching at least one object to be masked nested within the first anchors within any of the one or more paths within the data structure with a last object within the selector, assumed to be the corresponding display object of the subset of the display objects associated with the information to be masked; (d) upon not matching all of the first anchors within the first group with respective objects within one or more paths within the data structure, identifying a second group of one or more second anchors, other than the first anchors, within the selector, wherein the second anchors are subsequent to any previously matched first anchor; and (e) repeating (b)-(d) with the second group being the first group, the second anchors being the first anchors, wherein the matching being performed by comparing sub-paths starting from a last matched first anchor of the first anchors, the last matched first anchor being the furthest in the selector, and wherein the repeating is performed until no unused anchors exist within the selector.

In some cases, the second anchors within the second group is statistically more frequently found in the layouts of the application screen than the first anchors within the first group.

In some cases, upon the repeating being performed until no unused anchors exist within the selector, the method further comprises repeating (a)-(e) with a subsequent record of the records.

In accordance with a third aspect of the presently disclosed subject matter, there is provided a screen capturing system, the system comprising a processing resource configured to: provide an application configured to display an application screen comprising a plurality of display objects to a user of a user device, wherein a subset of the display objects is associated with information to be masked, and wherein at least one of the display objects of the subset is located at different non-uniquely identifiable locations in at least two different layouts of the application screen; receive, from the user device, upon execution of the application, a request to obtain a centralized managed list comprising one or more records including information characterizing the subset of the display objects associated with the information to be masked; and send the centralized managed list to the user device, thereby enabling the user device to determine a location, within the application screen displayed in a given layout of the at least two different layouts, of the subset of the display objects associated with the information to be masked and to generate at least one screen capture of the application screen in which the subset of the display objects associated with the information to be masked is masked.

In some cases, the processing resource is further configured to receive the at least one screen capture of the application screen and storing the at least one screen capture of the application screen in a data repository.

In some cases, the information characterizing the subset of the display objects associated with the information to be masked in each of the records includes non-heuristic identifiers.

In some cases, the non-heuristic identifiers include one or more of: a non-unique object id, an object place holder text, an object key.

In some cases, the information characterizing the subset of the display objects associated with the information to be masked in each of the records includes heuristic identifiers, each identifying a corresponding display object of the subset of the display objects associated with the information to be masked.

In some cases, each of the heuristic identifiers is a selector, being a path of objects expected to nest, in a corresponding layout of the at least two different layouts, a corresponding display object of the subset of the display objects associated with the information to be masked.

In some cases, the location of the subset of the display objects associated with the information to be masked is determined by finding an exact match between the path and an existing path within a data structure defining the application screen displayed in the given layout.

In some cases, upon no exact match being found, the location of the subset of the display objects associated with the information to be masked is determined by: (a) identifying a first group of one or more first anchors within the selector; (b) matching a maximal number of the first anchors within the first group with respective objects within one or more paths within the data structure, according to an order of the first anchors within the selector, giving rise to matching paths; (c) upon matching all of the first anchors within the first group with respective objects within one or more paths within the data structure, matching at least one object to be masked nested within the first anchors within any of the one or more paths within the data structure with a last object within the selector, assumed to be the corresponding display object of the subset of the display objects associated with the information to be masked; (d) upon not matching all of the first anchors within the first group with respective objects within one or more paths within the data structure, identifying a second group of one or more second anchors, other than the first anchors, within the selector, wherein the second anchors are subsequent to any previously matched first anchor; and (e) repeating (b)-(d) with the second group being the first group, the second anchors being the first anchors, wherein the matching being performed by comparing sub-paths starting from a last matched first anchor of the first anchors, the last matched first anchor being the furthest in the selector, and wherein the repeating is performed until no unused anchors exist within the selector.

In some cases, the second anchors within the second group is statistically more frequently found in the layouts of the application screen than the first anchors within the first group.

In some cases, upon the repeating being performed until no unused anchors exist within the selector, the processing resource is further configured to repeat (a)-(e) with a subsequent record of the records.

In accordance with a fourth aspect of the presently disclosed subject matter, there is provided a screen capturing system, the system comprising a processing resource configured to: provide an application configured to display an application screen comprising a plurality of display objects to a user of a user device, wherein a subset of the display objects is associated with information to be masked, and wherein at least one of the display objects of the subset is located at different non-uniquely identifiable locations in at least two different layouts of the application screen; request, from a server, upon execution of the application, to receive a centralized managed list comprising one or more records including information characterizing the subset of the display objects associated with the information to be masked; receive the centralized managed list from the server, determine a location, within the application screen displayed in a given layout of the at least two different layouts, of the subset of the display objects associated with the information to be masked; and generate at least one screen capture of the application screen in which the subset of the display objects associated with the information to be masked is masked.

In some cases, the processing resource is further configured to send the at least one screen capture of the application screen to the server for storage in a data repository.

In some cases, the information characterizing the subset of the display objects associated with the information to be masked in each of the records includes non-heuristic identifiers.

In some cases, the non-heuristic identifiers include one or more of: a non-unique object id, an object place holder text, an object key.

In some cases, the information characterizing the subset of the display objects associated with the information to be masked in each of the records includes heuristic identifiers, each identifying a corresponding display object of the subset of the display objects associated with the information to be masked.

In some cases, each of the heuristic identifiers is a selector, being a path of objects expected to nest, in a corresponding layout of the at least two different layouts, a corresponding display object of the subset of the display objects associated with the information to be masked.

In some cases, the location of the subset of the display objects associated with the information to be masked is determined by finding an exact match between the path and an existing path within a data structure defining the application screen displayed in the given layout.

In some cases, upon no exact match being found, the location of the subset of the display objects associated with the information to be masked is determined by: (a) identifying a first group of one or more first anchors within the selector; (b) matching a maximal number of the first anchors within the first group with respective objects within one or more paths within the data structure, according to an order of the first anchors within the selector, giving rise to matching paths; (c) upon matching all of the first anchors within the first group with respective objects within one or more paths within the data structure, matching at least one object to be masked nested within the first anchors within any of the one or more paths within the data structure with a last object within the selector, assumed to be the corresponding display object of the subset of the display objects associated with the information to be masked; (d) upon not matching all of the first anchors within the first group with respective objects within one or more paths within the data structure, identifying a second group of one or more second anchors, other than the first anchors, within the selector, wherein the second anchors are subsequent to any previously matched first anchor; and (e) repeating (b)-(d) with the second group being the first group, the second anchors being the first anchors, wherein the matching being performed by comparing sub-paths starting from a last matched first anchor of the first anchors, the last matched first anchor being the furthest in the selector, and wherein the repeating is performed until no unused anchors exist within the selector.

In some cases, the second anchors within the second group is statistically more frequently found in the layouts of the application screen than the first anchors within the first group.

In some cases, upon the repeating being performed until no unused anchors exist within the selector, the processing resource is further configured to repeat (a)-(e) with a subsequent record of the records.

In accordance with a fifth aspect of the presently disclosed subject matter, there is provided a non-transitory computer readable storage medium having computer readable program code embodied therewith, the computer readable program code, executable by at least one processor of a computer to perform a method comprising: providing an application configured to display an application screen comprising a plurality of display objects to a user of a user device, wherein a subset of the display objects is associated with information to be masked, and wherein at least one of the display objects of the subset is located at different non-uniquely identifiable locations in at least two different layouts of the application screen; requesting, from a server, upon execution of the application, to receive a centralized managed list comprising one or more records including information characterizing the subset of the display objects associated with the information to be masked; receiving the centralized managed list from the server; determining a location, within the application screen displayed in a given layout of the at least two different layouts, of the subset of the display objects associated with the information to be masked; and generating at least one screen capture of the application screen in which the subset of the display objects associated with the information to be masked is masked.

In accordance with a sixth aspect of the presently disclosed subject matter, there is provided a non-transitory computer readable storage medium having computer readable program code embodied therewith, the computer readable program code, executable by at least one processor of a computer to perform a method comprising: providing an application configured to display an application screen comprising a plurality of display objects to a user of a user device, wherein a subset of the display objects is associated with information to be masked, and wherein at least one of the display objects of the subset is located at different non-uniquely identifiable locations in at least two different layouts of the application screen; receiving, from the user device, upon execution of the application, a request to obtain a centralized managed list comprising one or more records including information characterizing the subset of the display objects associated with the information to be masked; and sending the centralized managed list to the user device, thereby enabling the user device to determine a location, within the application screen displayed in a given layout of the at least two different layouts, of the subset of the display objects associated with the information to be masked and to generate at least one screen capture of the application screen in which the subset of the display objects associated with the information to be masked is masked.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
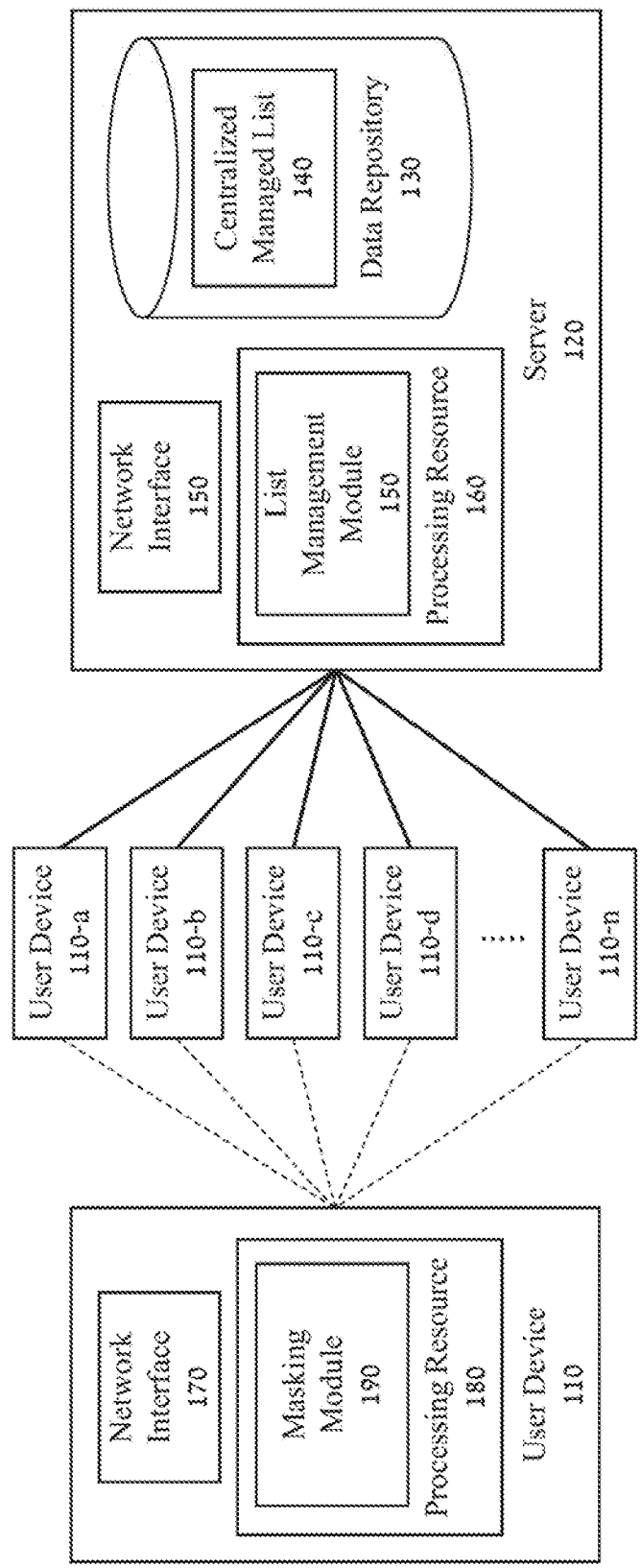
FIG. 1 is a block diagram schematically illustrating one example of an environment of a screen capturing and masking system, in accordance with the presently disclosed subject matter.

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures, and components have not been described in detail so as not to obscure the presently disclosed subject matter.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "providing", "receiving", "sending", "storing", "identifying", "matching", "repeating", "requesting", "determining", "generating", or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal desktop/laptop computer, a server, a computing system, a communication device, a smartphone, a tablet computer, a smart television, a processor (e.g. digital signal processor (DSP), a microcontroller, a field programmable gate array (FPGA), an application specific integrated circuit (ASIC), etc.), a group of multiple physical machines sharing performance of various tasks, virtual servers co-residing on a single physical machine, any other electronic computing device, and/or any combination thereof.

The operations in accordance with the teachings herein may be performed by a computer specially constructed for the desired purposes or by a general-purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus, the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 2:
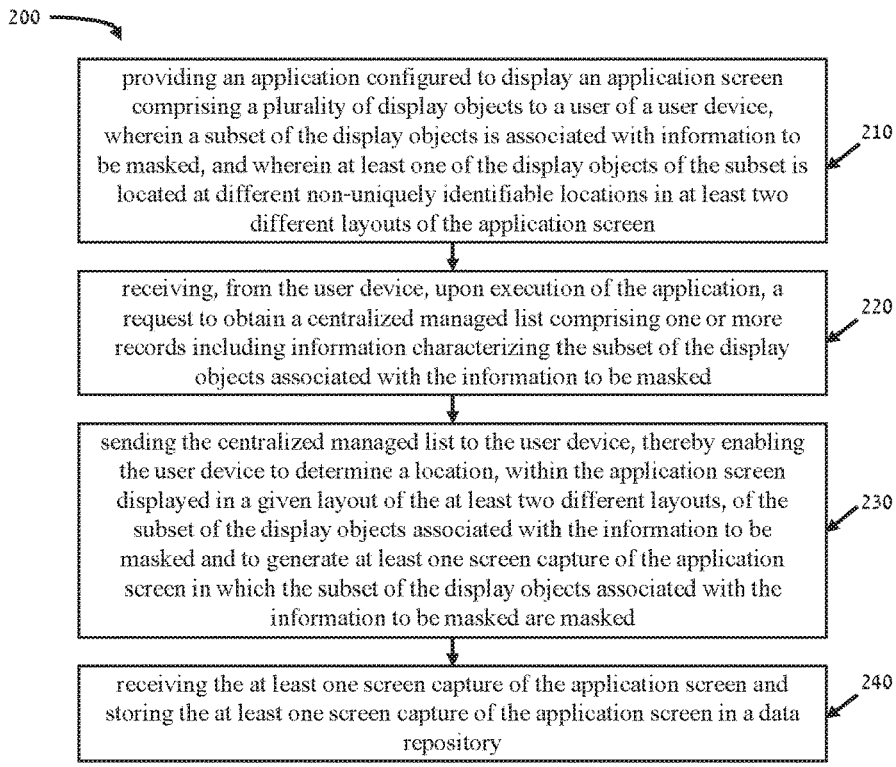
FIG. 2 is a flowchart illustrating one example of a sequence of operations carried out by a server for enabling screen capturing and masking by a user device, in accordance with the presently disclosed subject matter.
Figure 3:
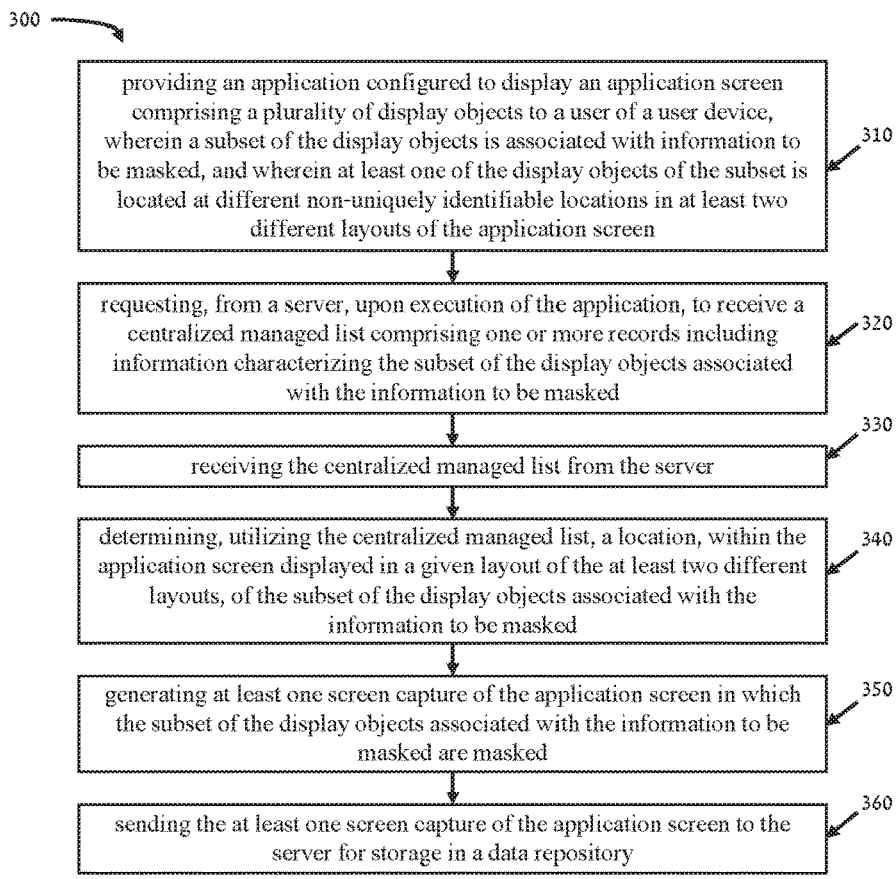
FIG. 3 is a flowchart illustrating one example of a sequence of operations carried out by a user device for screen capturing and masking, in accordance with the presently disclosed subject matter.
Figure 4:
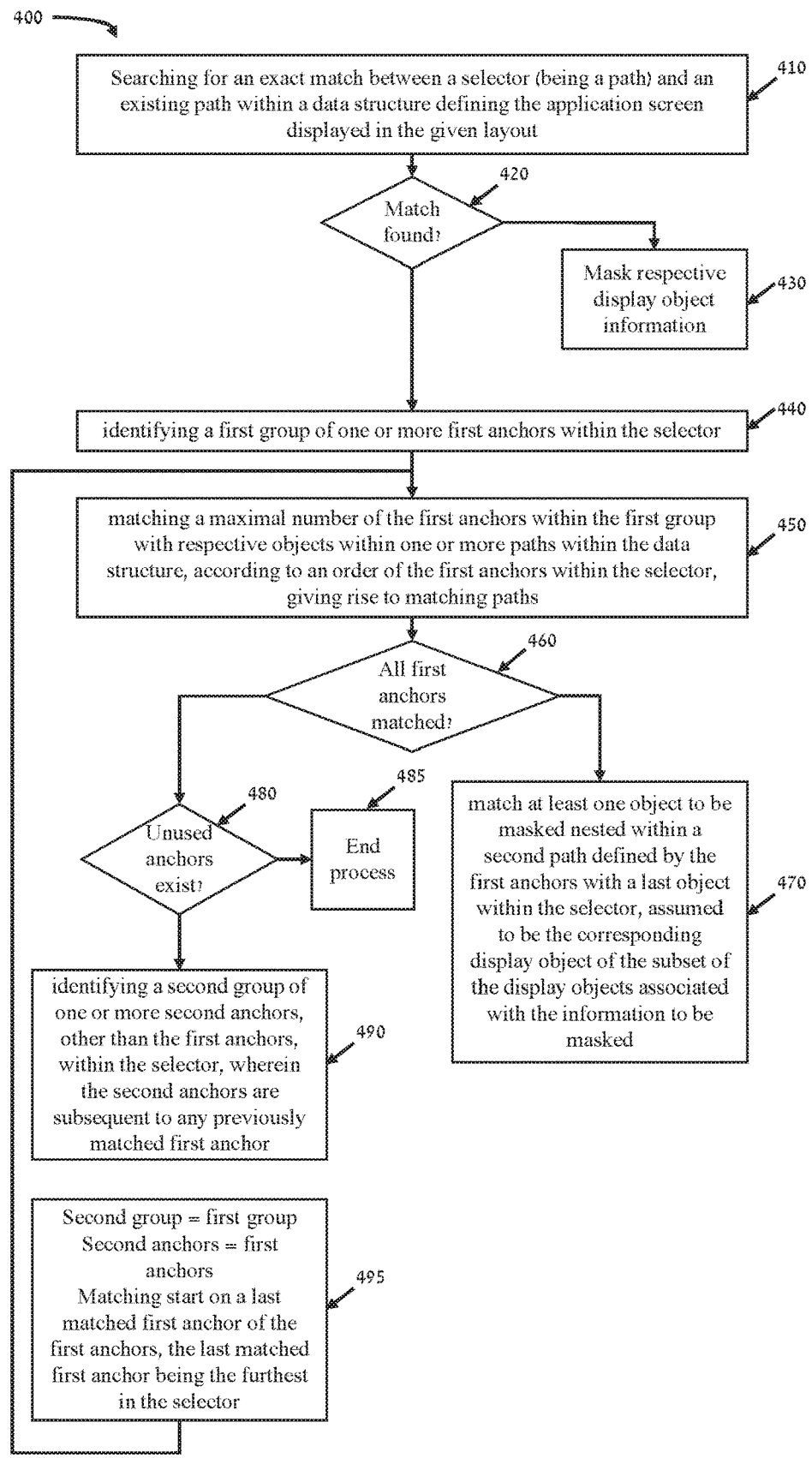
FIG. 4 is a flowchart illustrating one example of a sequence of operations carried out identifying objects to be masked using heuristic identifiers, in accordance with the presently disclosed subject matter.

In embodiments of the presently disclosed subject matter, fewer, more and/or different stages than those shown in FIGS. 2-4 may be executed. In embodiments of the presently disclosed subject matter one or more stages illustrated in FIGS. 2-4 may be executed in a different order and/or one or more groups of stages may be executed simultaneously. FIG. 1 illustrates a general schematic of the system architecture in accordance with an embodiment of the presently disclosed subject matter. Each module in FIG. 1 can be made up of any combination of software, hardware and/or firmware that performs the functions as defined and explained herein. The modules in FIG. 1 may be centralized in one location or dispersed over more than one location. In other embodiments of the presently disclosed subject matter, the system may comprise fewer, more, and/or different modules than those shown in FIG. 1.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Bearing this in mind, attention is drawn to FIG. 1, a block diagram schematically illustrating one example of an environment of a screen capturing and masking system, in accordance with the presently disclosed subject matter.

In accordance with the presently disclosed subject matter, the environment of the screen capturing and masking system includes at least one server 120, and a plurality of user devices (110-*a*, 110-*b*, 110-*c*, 110-*d*, ..., 110-*n*).

Each user device 110 includes a processing resource 180. Processing resource 180 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant user device 110 resources and for enabling operations related to user device 110 resources.

The processing resource 180 is configured to execute one or more applications with a masking module 190. The applications with the masking module 190 are configured to send to the server 120 at least one screen capture, of a screen displayed thereby on the user device 110, for recordation. The screen comprises a plurality of display objects, each including a certain piece of information, such as a commercial, an identification number, a name, an account number, or any other piece of information. Some of the display objects include information that is required to be masked before sending the screen capture for recordation, such as private and/or confidential information. The display objects that include information that is required to be masked (e.g. concealed, deleted, or made otherwise invisible) are identifiable using a centralized managed list that is managed by the server 120, and retrieved by the applications with the masking module 190 upon execution, or occasionally (e.g. based on retrieval rules). The masking process performed by the applications with the masking module 190 is further detailed herein, inter alia with reference to FIGS. 2-5.

Each user device 110 (being any of the plurality of user devices 110-a, 110-b, 110-c, 110-d, . . . , 110-n) further includes a network interface 170 enabling connecting the user device 110 to the server 120, via a communication network such as the Internet, and enabling it to send and receive data sent thereto through the communication network, including receiving the centralized managed list, or parts thereof, from the server 120 and/or sending screen captures from the user device 110 to the server 120 for recordation, as detailed herein, inter alia with reference to FIGS. 2-5.

Turning to the server 120, it comprises a data repository 130 (e.g. a database, a storage system, a memory including Read Only Memory—ROM, Random Access Memory—RAM, or any other type of memory, etc.) configured to store data, including, inter alia, the centralized managed list 140. The centralized managed list 140 comprises one or more records including information characterizing display objects associated to with information to be masked when recording a user session between an application configured to display an application screen comprising a plurality of display objects to a user of a user device 110 (the application being an application with a masking module 190).

Use of a centralized managed list 140 in the manner detailed throughout this specification can enable dynamically marking certain display objects for masking, and/or unmasking display items previously marked for masking, without a need in updating the application itself on the user devices 110.

It is to be noted that due to the fact that many parameters affect a layout of an application screen that includes objects associated with information to be masked, at least one of the display objects associated with information to be masked can be located at different non-uniquely identifiable locations in at least two different layouts of the application screen. For example, a given application screen can have a first layout on user device 110-a and a second layout, different than the first layout, on user device 110-b. In some cases, the layout can be different also on a given user device, e.g. depending on its spatial orientation (i.e. whether the application screen is presented in landscape or portrait mode of the given user device). Some of the parameters that can affect the layout of an application screen include a type of user device (e.g. iPhone X, iPhone 6, iPhone 6S, Samsung Galaxy Note, Samsung Galaxy 8, Google Nexus, etc.), an operating system type and/or version (Android/iOS and their various distribution versions), etc. It is to be noted that these are mere examples of parameters that may affect the layout of an application screen, and other parameters can also have an effect thereon. It is to be further noted that the presently disclosed subject matter will enable identifying the at least one of the display objects associated with information to be masked even if it is located at identical non-uniquely identifiable locations in at least two layouts of the application screen, whether the at least two layouts are identical, or different from one another.

The one or more records including information characterizing display objects associated with information to be masked includes information that enables determining the location of such objects in a plurality of layouts (that may be different from one another) of the screen, e.g. based on heuristics, as further detailed herein.

The server 120 further comprises a network interface 150 enabling connecting the server 120 to the user devices, via a communication network such as the Internet, and enabling it to send and receive data sent thereto through the communication network, including sending the centralized managed list, or parts thereof, to the user devices and/or receiving screen captures from the user devices for recordation, as detailed herein, inter alia with reference to FIGS. 2-5.

Server 120 further comprises a processing resource 160. Processing resource 160 can be one or more processing units (e.g. central processing units), microprocessors, microcontrollers (e.g. microcontroller units (MCUs)) or any other computing devices or modules, including multiple and/or parallel and/or distributed processing units, which are adapted to independently or cooperatively process data for controlling relevant server 120 resources and for enabling operations related to server 120 resources.

The processing resource 160 comprises a list management module 155 configured to manage the centralized managed list 140, e.g. by updating it to delete existing records, and/or to update existing records, and/or to introduce new records including information characterizing new display objects associated with information to be masked within an existing application screen of an existing application, or within new application screens of an existing application or of a new application.

Attention is now drawn to FIG. 2, showing a flowchart illustrating one example of a sequence of operations carried out by a server for enabling screen capturing and masking by a user device, in accordance with the presently disclosed subject matter.

According to certain examples of the presently disclosed subject matter, server 120 can be configured to perform screen capturing and masking enablement process 200.

For this purpose, server 120 (e.g. utilizing masking enablement module 157) can be configured to provide an application configured to display an application screen comprising a plurality of display objects to a user of a user device 110 (block 210). A subset of the display objects that the application is configured to display on the application screen is associated with information to be masked. As indicated with respect to FIG. 1, when executing the application on different user devices 110, the layouts of the application screen(s) may vary between the different devices. Accordingly, at least one of the display objects of the subset may be located, upon execution of the application and display of the application screen, at different non-uniquely identifiable locations in at least two different layouts of the application screen.

The application can be stored locally on the data repository 130 or elsewhere, as long as it is available for the server 120 for sending to any user device 110 that requests to download it.

Server 120 is further configured to receive, from the user device 110, upon execution of the application provided at block 210, a request to obtain a centralized managed list 140 comprising one or more records including information characterizing the subset of the display objects associated with the information to be masked (block 220). In response to the request, the server 120 is configured to send the centralized managed list 140 to the user device 110, thereby enabling the user device 110 to (a) determine, using the information contained within the centralized managed list 140, a location, within the application screen displayed in a given layout of the at least two different layouts, of the subset of the display objects associated with the information to be masked, and (b) to generate at least one screen capture of the application screen in which the subset of the display objects associated with the information to be masked are masked (e.g. concealed, deleted, or made otherwise invisible) (block 230).

In some cases, the server 120 is further configured to receive the at least one screen capture of the application screen generated by the application and to store the at least one screen capture of the application screen in the data repository 130 (block 240).

It is to be noted that although in the above description of the screen capturing and masking enablement process 200 the centralized managed list 140 is pulled by the user devices 110 from the server 120, in other embodiments, the centralized managed list 140 can be pushed by the server 120 to the user devices 110. In such cases, the centralized managed list 140 can be pushed by the server 120 to the user devices 110 whenever it is changed, or periodically, or according to any other scheduling method.

It is to be noted that, with reference to FIG. 2, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

Turning to FIG. 3, there is shown a flowchart illustrating one example of a sequence of operations carried out by a user device for screen capturing and masking, in accordance with the presently disclosed subject matter.

According to certain examples of the presently disclosed subject matter, user device 110 can be configured to perform a screen capturing and masking process 300.

For this purpose, user device 110 (e.g. utilizing application with masking module 190) can be configured to provide an application configured to display an application screen comprising a plurality of display objects to a user of a user device S10 (block 310). A subset of the display objects that the application is configured to display on the application screen is associated with information to be masked. As indicated with respect to FIG. 1, when executing the application on different user devices 110, the layouts of the application screen(s) may vary between the different devices. Accordingly, at least one of the display objects of the subset may be located, upon execution of the application and display of the application screen, at different non-uniquely identifiable locations in at least two different layouts of the application screen.

The application can be downloaded from the server 120, or from any other location, and stored locally on a local memory of the user device 110 or elsewhere, as long as it is available for the user device 110 for execution.

User device 110 is further configured to request, from the server 120, upon execution of the application provided at block 310, to receive a centralized managed list 140 comprising one or more records including information characterizing the subset of the display objects associated with the information to be masked (block 320), and to receive the centralized managed list 140 from the server 120 (block 330).

Utilizing the information within the centralized managed list 140, the user device 110 can determine a location, within the application screen displayed in a given layout of the at least two different layouts, of the subset of the display objects associated with the information to be masked (block 340).

It is to be noted that in some cases, the information characterizing the subset of the display objects associated with the information to be masked in each of the records includes non-heuristic identifiers. The non-heuristic identifiers can include, for example, one or more of: a non-unique object id, an object place holder text, an object key, or any other identifier that can be associated with the corresponding display object. When using such non-heuristic identifiers, the application can be configured to identify the display objects associated with the non-heuristic identifiers and mask such display objects.

It is to be noted, however, that use of such non-heuristic identifiers may result in misidentification of display objects. For example, as in some cases such non-heuristic identifiers are non-unique, two or more display objects can share an identical object id. In many mobile application development languages, there is indeed no restriction of uniqueness for object ids, let alone object placeholder text or object keys. Accordingly, when using non-heuristic identifiers, some display objects can be erroneously identified as display objects associated with information to be masked, while they in fact are not associated with any information that requires masking.

Another problem that may arise when using non-heuristic identifiers results from the fact that in many cases applications are updated from time to time, which can result in changes to values of some of the display objects, including optionally their object ids, their object place holder text and/or their object keys. Any change in such value will require updating the non-heuristic identifiers in accordance with the value changes made as part of the application update. This requires specific attention from the developers of the application. Any mistake on the application developer end will result in misidentifications of display objects that are not associated with information to be masked as display objects that are associated with information to be masked, or vise versa.

Therefore, in some cases the information characterizing the subset of the display objects associated with the information to be masked in at least part of, and optionally in each, of the records can include heuristic identifiers, each identifying a corresponding display object of the subset of the display objects associated with the information to be masked. In some cases, each of the heuristic identifiers is a selector, being a path of objects expected to nest, in a corresponding layout of the at least two different layouts, a corresponding display object of the subset of the display objects associated with the information to be masked.

A further explanation about the determination of the location of the subset of the display objects associated with the information to be masked when using such heuristic identifiers is provided herein, inter alia with reference to FIG. 4.

User device 110 is further configured to generate at least one screen capture of the application screen in which the subset of the display objects associated with the information to be masked are masked (block 350). In some cases, a plurality of screen captures are generated, e.g. throughout at least part of a session a user conducts via the application, optionally at a rate that enables generating a video that displays any user interaction made via the application during the at least part of the session. It is to be noted that the screen capture can either be generated with some portions thereof being masked, or it a screen capture is first generated and only then those pieces of information that require masking are masked on the generated screen capture.

In some cases, user device 110 can be further configured to send the at least one screen capture of the application screen to the server for storage in a data repository 130 (block 360).

It is to be noted, as indicated herein, that although in the above description of the screen capturing and masking process 300 the centralized managed list 140 is pulled by the user device 110 from the server 120, in other embodiments, the centralized managed list 140 can be pushed by the server 120 to the user device 110. In such cases, the centralized managed list 140 can be pushed by the server 120 to the user device 110 whenever it is changed, or periodically, or according to any other scheduling method.

It is to be noted that, with reference to FIG. 3, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

As indicated with respect to block 340 above, in some cases heuristic identifiers are used in order to determine a location of display objects associated with information to be masked. FIG. 4 is a flowchart illustrating one example of a sequence of operations carried out identifying objects to be masked using heuristic identifiers, in accordance with the presently disclosed subject matter.

According to certain examples of the presently disclosed subject matter, user device 110 can be configured to perform a location determination process 400 for each heuristic identifier within the centralized managed list 140, or for a subset thereof.

For this purpose, user device 110 (e.g. utilizing application with masking module 190) can be configured to search for an exact match between a given heuristic identifier, namely a selector (being a path expected to be associated with a display object), and an existing path within a data structure defining the application screen displayed in the given layout (block 410).

An exemplary path of an exemplary button displayed on an exemplary layout of an exemplary application scree is as follows:

"LinearLayout[0]>FrameLayout[0]>action_bar_root[0]>content[0]>root_linear_layout[0]>viewpager[0]>new_phone_launch_widget[0]>launch_list_widget[0]>card_view[0]>LinearLayout[0]>LinearLayout[1]>button_one[0]"

User device 110 is configured to check if a match was found (block 420). If a match is found at block 420, the information associated with the respective display object is identified for masking, so that at block 350 it can be masked (block 430). However, if no match is found at block 420, the user device 110 is configured to identify a first group of one or more first anchors (being parts of the path, and more specifically building blocks of the path, where each such building block is separated by a delimiting character such as the ">" in the exemplary path provided above) within the selector (block 440). In some cases, the first anchors within the first group are statistically less frequently found in the various possible layouts of the application screen than other anchors not in the first group.

Looking at the example provided above, "action_bar_root[0]", "viewpager[0]" and "card_view[0]" can be selected, assuming that they are statistically less frequently found in the various possible layouts of the application screen in comparison to other anchors not in the first group.

After the first anchors are identified, user device 110 matches a maximal number of the first anchors within the first group with respective objects within one or more paths within the data structure (that defines the application screen displayed in the given layout), according to an order of the first anchors within the selector, giving rise to matching paths (block 450). Continuing the example above, user device 110 will attempt to find the anchor "action_bar_root[0]", and then it will try to find the anchor "viewpager[0]" nested below the "action_bar_root[0]" anchor. If it succeeds, it will try to find the anchor "card_view[0]" nested below the "viewpager[0]" anchor.

User device 110 is configured to check if all first anchors were matched within any of the existing paths within the data structure defining the application screen displayed in the given layout (block 460). If so—user device 110 matches at least one object to be masked, nested below the first anchors within any of the existing paths within the data structure defining the application screen displayed in the given layout, with a last object within the selector, assumed to be the corresponding display object of the subset of the display objects associated with the information to be masked (block 470).

If not matching all of the first anchors, user device 110 is further configured to check if any unused anchors exist within the selector (i.e. anchors that were not yet used at the location determination process 400) (block 480). If not—the process ends (block 485). If there are unused anchors, the user device 110 is further configured to identify a second group of one or more second anchors, other than the first anchors, within the selector, wherein the second anchors are subsequent to any previously matched first anchor (block 490). In some cases, the second anchors within the second group is statistically more frequently found in the layouts of the application screen than the first anchors within the first group.

Looking at the example provided above, and assuming that only "action_bar_root[0]" was identified from the first anchors in the first group at block 450, "root_linear_layout[0]", and "new_phone_launch_widget[0]" can be identified, assuming that they are (a) statistically less frequently found in the various possible layouts of the application screen in comparison to any other unused anchors, and (b) statistically more frequently found in the various possible layouts of the application screen in comparison to any previously used anchors. If both "action_bar_root[0]", and "viewpager[0]" were identified from the first anchors in the first group at block 450, "new_phone_launch_widget[0]" can be identified, as out of the unused anchors, it is the only one that appears after the last identified anchor of the first group ("viewpager[O]"), and it is (a) statistically less frequently found in the various possible layouts of the application screen in comparison to any other unused anchors, and (b) statistically more frequently found in the various possible layouts of the application screen in comparison to any previously used anchors.

User device 110 is then configured to define the second group identified at block 490 as the first group and the second anchors as the first anchors (block 495) and return to block 450 to perform the matching by comparing sub-paths starting from a last matched first anchor of the first anchors, the last matched first anchor being the furthest in the selector. This process is performed until no unused anchors exist within the selector. In some cases, user device 110 can be configured, upon no unused anchors exist within the selector, to repeat the location determination process 400 with a subsequent record of the records, until no additional records exist within the centralized managed list 140.

It is to be noted that in some cases the centralized managed list 140 can include information associating each of the records with a given application screen, and in such cases, the location determination process 400 can be performed for those record within the centralized managed list 140 that are associated with the application screen that is being displayed on the user device 110 when the process is executed.

It is to be noted that, with reference to FIG. 4, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

Figure 5:
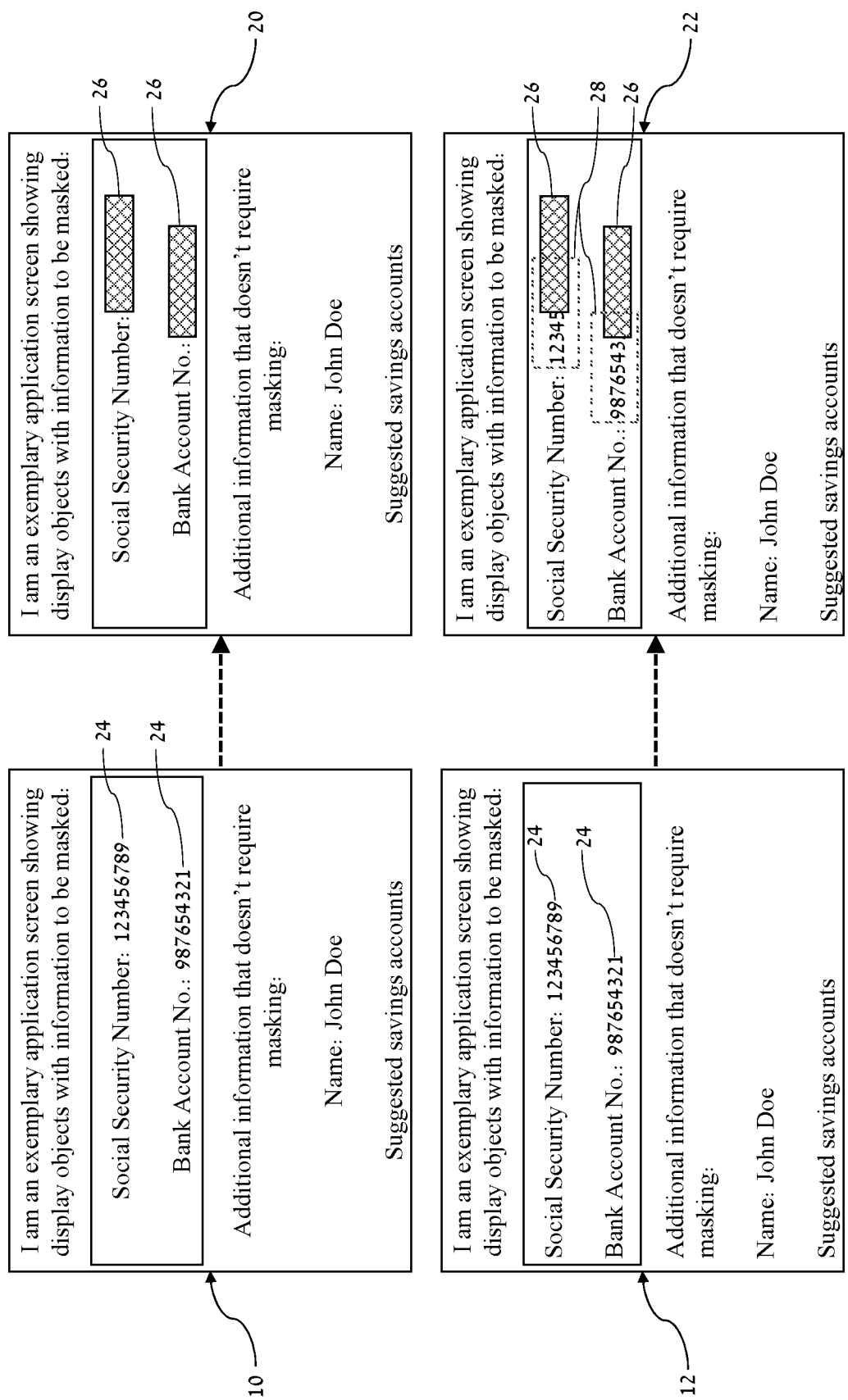
FIG. 5 is a schematic illustration of exemplary challenges in screen capturing and masking in different layouts, in accordance with the prior art.

FIG. 5 is a schematic illustration of exemplary challenges in screen capturing and masking in different layouts, in accordance with the prior art.

In the illustration, two exemplary layouts of a given application screen generated by a given application are shown, namely first display layout 10 and second display layout 12, each displayed on a different user device 110. In addition, two screen captures, of the two layouts are shown, namely first screen capture 20, being a screen capture of the first display layout 10, and second screen capture 22 being a screen capture of the second display layout 12.

Both first display layout 10 and second display layout 12 display identical information, however, from various reasons, the layouts are arranged differently, so that the location of the display objects differs between the layouts. This is common when using mobile devices, where the layout depends, as indicated herein above, on various parameters, such as screen size, screen resolution, operating system, operating system version, display type (e.g. portrait vs. landscape), etc.

In both the first display layout 10 and the second display layout 12, two display items are shown that are required to be masked, namely the social security number and the bank account number, referred to in the illustration as items for masking 24. The location of the items for masking 24 in the first display layout 10 is different than the location of the items for masking 24 in the second display layout 12.

Due to the fact that the location of the items for masking 24 in the first display layout 10 is different than the location of the items for masking 24 in the second display layout 12, an attempt to mask the items using a fixed location (e.g. determined by analysis of the first display layout 10), will result in failure to mask at least part of the items for masking 24, as shown in the illustration. In the screen captures (first screen capture 20 and second screen capture 22), masking 26 is added at a certain location on the layout. The masking 26 of the items for masking 24 is accurate on the first display layout 10, but on the second display layout 12, due to the fact that the masking 26 is placed on a fixed location, the masking 26 misses parts of the items for masking 24, so that part of the social security number and the bank account number are still visible. A desired masking 28 is also shown on the second screen capture 22, indicating where the masking should have been made, if the location of the masking 26 was not fixed to a certain location. According to the presently disclosed subject matter, the masking process would have result in the masking being placed in the correct location, irrespective of a layout of the display objects associated with the information to be masked.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A screen capturing method, the method comprising:
providing an application to a user device, the application being configured to display an application screen comprising a plurality of display objects to a user of the user device, the application screen being displayed in a given layout of at least two different layouts of the application screen, wherein a subset of the display objects are associated with information to be masked, and wherein each layout of the different layouts, other than the given layout, is either on the user device or on a different user device, different than the user device;
receiving, from the user device, a request to obtain a centralized managed list comprising one or more records including information characterizing the subset of the display objects associated with the information to be masked; and
sending the centralized managed list to the user device;
wherein the application is configured to:
determine a location, within the displayed application screen, of the subset of the display objects associated with the information to be masked, based on the centralized managed list; and
in response to the determine, generate at least one screen capture of the displayed application screen in which the subset of the display objects associated with the information to be masked are masked.

2. The screen capturing method of claim 1, further comprising receiving the at least one screen capture of the application screen and storing the at least one screen capture of the application screen in a data repository.

3. The screen capturing method of claim 1, wherein the information characterizing the subset of the display objects associated with the information to be masked in each of the records includes non-heuristic identifiers.

4. The screen capturing method of claim 3, wherein the non-heuristic identifiers include one or more of: a non-unique object id, an object place holder text, an object key.

5. The screen capturing method of claim 1, wherein the information characterizing the subset of the display objects associated with the information to be masked in each of the records includes heuristic identifiers, each identifying a corresponding display object of the subset of the display objects associated with the information to be masked.

6. The screen capturing method of claim 5, wherein each of the heuristic identifiers is a selector, being a path of objects expected to nest, in a corresponding layout of the at least two different layouts, a corresponding display object of the subset of the display objects associated with the information to be masked.

7. The screen capturing method of claim 6, wherein the location of the subset of the display objects associated with the information to be masked is determined by finding an exact match between the path and an existing path within a data structure defining the application screen displayed in the given layout.

8. The screen capturing method of claim 7, wherein upon no exact match being found, the location of the subset of the display objects associated with the information to be masked is determined by:
(a) identifying a first group of one or more first anchors within the selector;
(b) matching a maximal number of the first anchors within the first group with respective objects within one or more paths within the data structure, according to an order of the first anchors within the selector, giving rise to matching paths;
(c) upon matching all of the first anchors within the first group with respective objects within one or more paths within the data structure, matching at least one object to be masked nested within the first anchors within any of the one or more paths within the data structure with a last object within the selector, assumed to be the corresponding display object of the subset of the display objects associated with the information to be masked;
(d) upon not matching all of the first anchors within the first group with respective objects within one or more paths within the data structure, identifying a second group of one or more second anchors, other than the first anchors, within the selector, wherein the second anchors are subsequent to any previously matched first anchor; and
(e) repeating (b)-(d) with the second group being the first group, the second anchors being the first anchors, wherein the matching being performed by comparing sub-paths starting from a last matched first anchor of the first anchors, the last matched first anchor being the furthest in the selector, and wherein the repeating is performed until no unused anchors exist within the selector.

9. The screen capturing method of claim 8, wherein the second anchors within the second group is statistically more frequently found in the layouts of the application screen than the first anchors within the first group.

10. The screen capturing method of claim 8, wherein upon the repeating being performed until no unused anchors exist within the selector, repeat (a)-(e) with a subsequent record of the records.

11. A screen capturing system, the system comprising a processing resource configured to:
provide an application to a user device, the application being configured to display an application screen comprising a plurality of display objects to a user of the user device, the application screen being displayed in a given layout of at least two different layouts of the application screen, wherein a subset of the display objects are associated with information to be masked, and wherein each layout of the different layouts, other than the given layout, is either on the user device or on a different user device, different than the user device;
receive, from the user device, a request to obtain a centralized managed list comprising one or more records including information characterizing the subset of the display objects associated with the information to be masked; and
send the centralized managed list to the user device;
wherein the application is configured to:
determine a location, within the displayed application screen, of the subset of the display objects associated with the information to be masked, based on the centralized managed list; and
in response to the determine, generate at least one screen capture of the displayed application screen in which the subset of the display objects associated with the information to be masked are masked.

12. The screen capturing system of claim 11, wherein the processing resource is further configured to receive the at least one screen capture of the application screen and storing the at least one screen capture of the application screen in a data repository.

13. The screen capturing system of claim 11, wherein the information characterizing the subset of the display objects associated with the information to be masked in each of the records includes non-heuristic identifiers.

14. The screen capturing system of claim 11, wherein the information characterizing the subset of the display objects associated with the information to be masked in each of the records includes heuristic identifiers, each identifying a corresponding display object of the subset of the display objects associated with the information to be masked.

15. The screen capturing system of claim 14, wherein each of the heuristic identifiers is a selector, being a path of objects expected to nest, in a corresponding layout of the at least two different layouts, a corresponding display object of the subset of the display objects associated with the information to be masked.

16. The screen capturing system of claim 15, wherein the location of the subset of the display objects associated with the information to be masked is determined by finding an exact match between the path and an existing path within a data structure defining the application screen displayed in the given layout.

17. The screen capturing system of claim 16, wherein upon no exact match being found, the location of the subset of the display objects associated with the information to be masked is determined by:
(a) identifying a first group of one or more first anchors within the selector;
(b) matching a maximal number of the first anchors within the first group with respective objects within one or more paths within the data structure, according to an order of the first anchors within the selector, giving rise to matching paths;
(c) upon matching all of the first anchors within the first group with respective objects within one or more paths within the data structure, matching at least one object to be masked nested within the first anchors within any of the one or more paths within the data structure with a last object within the selector, assumed to be the corresponding display object of the subset of the display objects associated with the information to be masked;
(d) upon not matching all of the first anchors within the first group with respective objects within one or more paths within the data structure, identifying a second group of one or more second anchors, other than the first anchors, within the selector, wherein the second anchors are subsequent to any previously matched first anchor; and (e) repeating (b)-(d) with the second group being the first group, the second anchors being the first anchors, wherein the matching being performed by comparing sub-paths starting from a last matched first anchor of the first anchors, the last matched first anchor being the furthest in the selector, and wherein the repeating is performed until no unused anchors exist within the selector.

18. The screen capturing system of claim 17, wherein the second anchors within the second group is statistically more frequently found in the layouts of the application screen than the first anchors within the first group.

19. The screen capturing system of claim 17, wherein upon the repeating being performed until no unused anchors exist within the selector, repeat (a)-(e) with a subsequent record of the records.

20. A non-transitory computer readable storage medium having computer readable program code embodied therewith, the computer readable program code, executable by at least one processor of a computer to perform a method comprising:

providing an application, by a user device, the application being configured to display an application screen comprising a plurality of display objects to a user of the user device, the application screen being displayed in a given layout of at least two different layouts of the application screen, wherein a subset of the display objects are associated with information to be masked, and wherein each layout of the different layouts, other than the given layout, is either on the user device or on a different user device, different than the user device;

requesting, from a server, to receive a centralized managed list comprising one or more records including information characterizing the subset of the display objects associated with the information to be masked;

receiving the centralized managed list from the server;

determining a location, within the displayed application screen, of the subset of the display objects associated with the information to be masked, based on the centralized managed list; and in response to the determining, generating at least one screen capture of the displayed application screen in which the subset of the display objects associated with the information to be masked are masked.

* * * * *